No. 639,285. Patented Dec. 19, 1899.
E. L. POST.
SAW TOOL.
(Application filed July 22, 1899.)
(No Model.) 3 Sheets—Sheet 1.
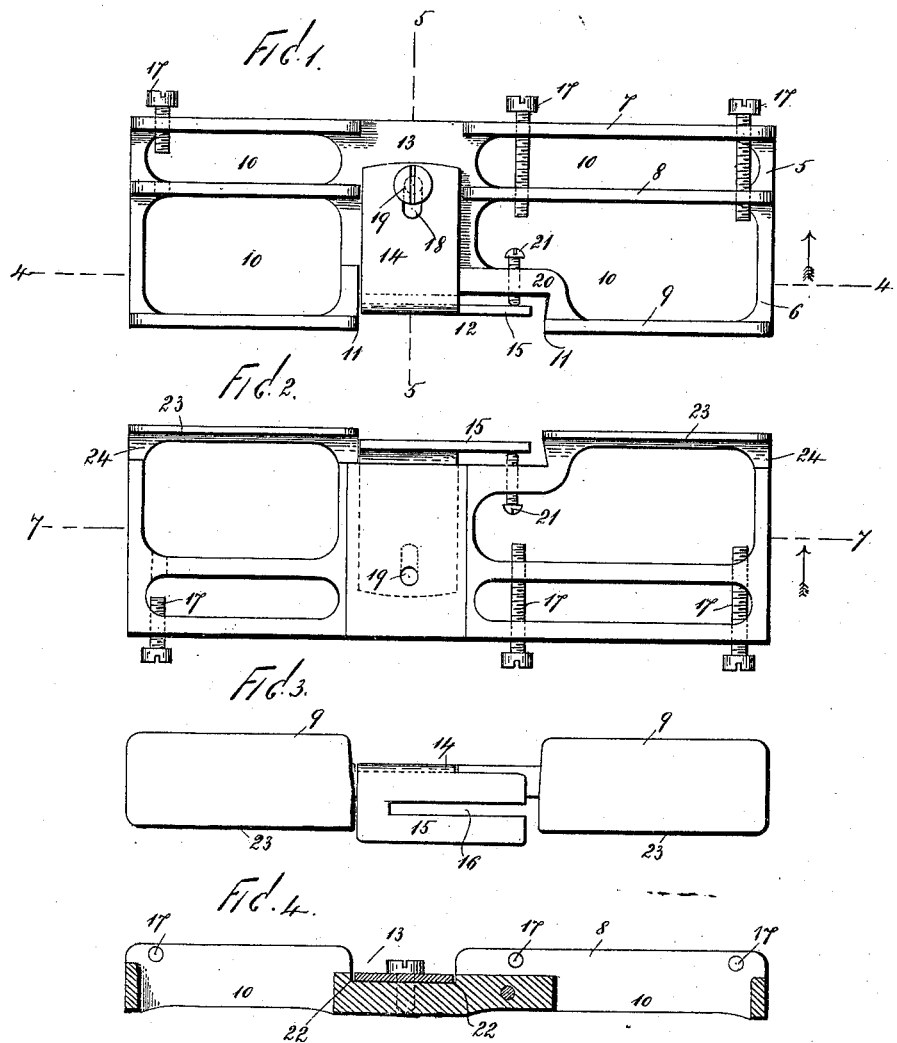

No. 639,285. Patented Dec. 19, 1899.
E. L. POST.
SAW TOOL.
(Application filed July 22, 1899.)
(No Model.) 3 Sheets—Sheet 2.
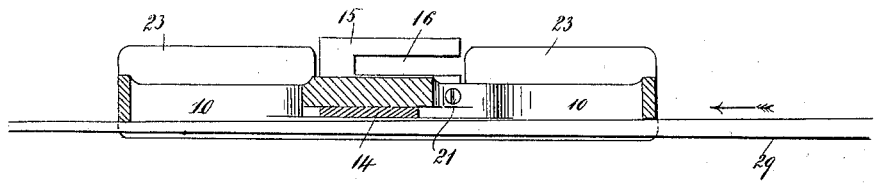
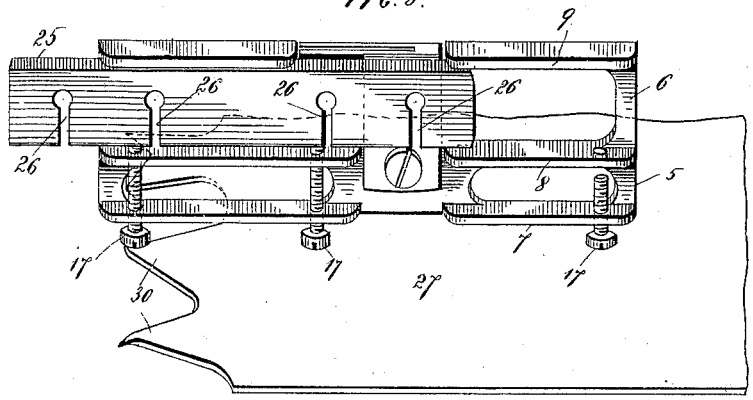
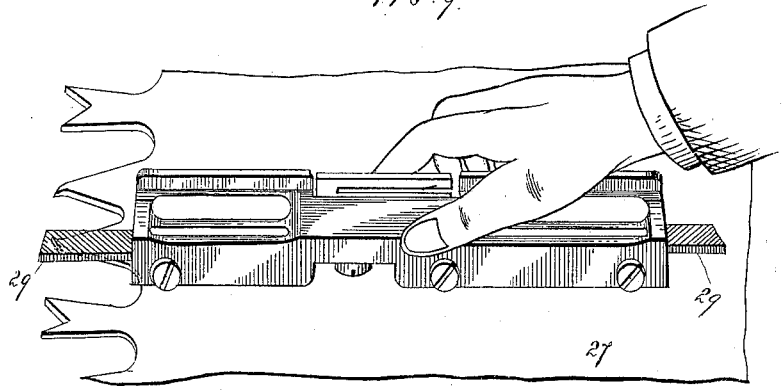
WITNESSES
John Buckler,
F. A. Stewart
INVENTOR
Ezra L. Post
BY
Edgar Tate & Co
ATTORNEYS No. 639,285. Patented Dec. 19, 1899.
E. L. POST.
SAW TOOL.
(Application filed July 22, 1899.)
(No Model.) 3 Sheets—Sheet 3.
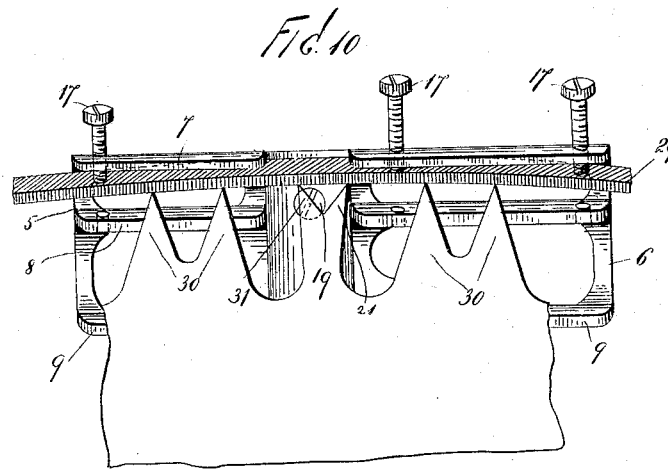
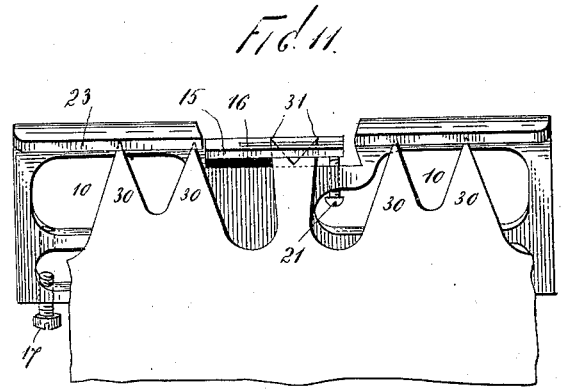
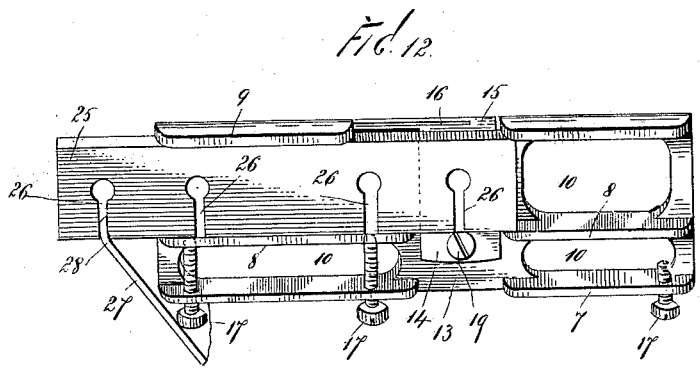
WITNESSES
John Ruckler,
F. A. Stuart
INVENTOR
Ezra L. Post
BY
Edgar Tate & Co
ATTORNEYS

UNITED STATES PATENT OFFICE.

EZRA L. POST, OF WALLINGFORD, CONNECTICUT.

SAW-TOOL.

SPECIFICATION forming part of Letters Patent No. 639,285, dated December 19, 1899.

Application filed July 22, 1899. Serial No. 724,754. (No model.)

*To all whom it may concern:*

Be it known that I, EZRA L. POST, a citizen of the United States, residing at Wallingford, in the county of New Haven and State of Connecticut, have invented certain new and useful Improvements in Saw-Tools, of which the following is a full and complete specification, such as will enable those skilled in the art to which it appertains to make and use the same.

This invention relates to saw-tools; and the object thereof is to provide an improved tool of this class by means of which the teeth of a saw may be quickly, easily, and evenly set and whereby the circular curve of the teeth of a crosscut or other large saw may be regulated and properly gaged and the length of the raker-teeth also properly regulated, a further object being to provide a tool of the class described by means of which the set of the teeth may be tested and said teeth conveniently side-dressed; and with these and other objects in view the invention consists in a tool constructed as hereinafter described and claimed.

The invention is fully disclosed in the following specification, of which the accompanying drawings form a part, in which—

Figure 1 is a front view of my improved tool; Fig. 2, a back view thereof; Fig. 3, a bottom plan view; Fig. 4, a longitudinal section on the line 4 4 of Fig. 1; Fig. 5, a transverse section on the line 5 5 of Fig. 1; Fig. 6, an end view; Fig. 7, a section on the line 7 7 of Fig. 2, showing the tool dressing-file in position; Fig. 8, a perspective view showing the method of using the tool to test the set of the teeth of the saw; Fig. 9, a perspective view showing the method of using the tool in side-dressing the teeth of the saw; Fig. 10, a perspective view showing the method of using the tool in fixing the curvature of the point of the teeth of a large saw; Fig. 11, a similar view showing the method of using the tool in fixing the lengths of the raker-teeth, and Fig. 12 a similar view showing the method of using the tool in setting the teeth of a saw.

In the drawings forming part of this specification the separate parts of my improvement are designated by the same numerals of reference in each of the views, and in the practice of my invention I provide a tool of the class described, which for the purposes of description I will describe as having a top, a bottom, front, and a back, the front and back of the tool being shown in Figs. 1 and 2 and the bottom thereof in Fig. 3.

My improved tool is oblong and preferably rectangular in form, and the front side thereof is provided with two horizontal spaces 5 and 6, formed by a top flange 7, an intermediate flange 8, and a bottom flange 9, and that part of the tool on which the flange 7 is formed is called the "top" thereof and that part on which the flange 9 is formed the "bottom" of said tool. The body of the tool is cut out longitudinally between the flanges 7, 8, and 9 at each end, as shown at 10, in order to make said tool as light as possible, and the bottom of the tool is cut out longitudinally centrally between the points 11 to form an oblong open space 12, and the said flanges 7, 8, and 9 are cut out transversely at the middle of the tool to form a transverse space 13, in which is placed a transversely-adjustable plate 14, provided at its lower end with a backwardly-directed flange or angular extension 15, in which is formed a longitudinal slot 16. The flange 7 is also provided with a plurality of screws 17, which pass therethrough and also are adapted to pass through the flange 8, and, as shown in the drawings, three of said screws are employed, and two of said screws—those adjacent to the right-hand end of the tool—are preferably longer than the other, and one of said screws is also placed closely adjacent to each end of the tool. The plate 14 is provided with a longitudinal slot 18, through which is passed a screw 19, by means of which said plate is connected with the central portion of the tool, and the central portion of the tool is also provided with a horizontal part 20, through which is passed a short screw 21, which is adapted to bear on the flange or angular extension 15 of the transversely-adjustable plate 14, and the transversely-adjustable plate 14 fits closely between the shoulders 22, (shown in Fig. 4,) and said plate is free to move transversely of the tool, but cannot move laterally. The bottom of the tool is also provided at the back thereof with a longitudinal flange 23 similar to the flange 9, and said back of the tool, adjacent to said flange, is cut out longitudinally to form a groove 24, as clearly shown in Figs. 5 and 6, and with the exception of the longitudinal flange 23 and the longitudinal groove 24 the back of the tool is preferably smooth and even.

I also provide an oblong plate 25, which is shown in Fig. 8, and which is adapted to fit in the longitudinal space 6, as shown in Figs. 8 and 12, and this plate is provided in one side thereof with a plurality of transverse slots 26, which are of different widths, and in operating the tool to set the teeth of a saw the said oblong plate 25 is clamped in said space 6 by one or more of the screws 17. I have also shown at 27 a part of a saw, and in operating the tool to set the teeth of a saw the said tool is inverted, as shown in Fig. 12, and the cutting-teeth, one of which is shown at 28, are alternately inserted into one of the transverse slots 26, and the screw 17 at the left-hand end of the tool is adjusted so as to fix the set of the teeth, and the tool is then depressed to the right, which operation bends the teeth or sets them, as will be readily understood. It will also be understood that the tool is applied to the cutting-teeth alternately on opposite sides of the saw, this operation being necessary to properly set all the teeth of the saw, and the side-dressing of the teeth is done in the manner shown in Fig. 9. For this purpose a file 29 is fastened in the wider space 6 by means of the screws 17, and said tool is passed over or transversely of the saw, being held in the position shown in Fig. 9, which operation properly side-dresses the teeth of the saw. It will also be apparent that if any of the teeth have too much set the same will be determined by this operation of side-dressing, and the set of the teeth may thus be properly regulated.

On an examination of Fig. 7 it will be seen that the space 6, in which the file is placed, is deeper at one end than at the other, and the files used for this purpose are ordinary files, which are as a rule thicker at one end than at the other, and by shoving the file through the tool in the direction shown by the arrow $a$ in Fig. 9 the extent to which the teeth are side-dressed and the proper position of the file in order to accomplish said side-dressing may be easily determined, it being understood that the flanges 8 and 9 project slightly below the file when the file is in the position shown in Fig. 7, especially at the left-hand end of the tool; but by moving the file in the direction of the left-hand end of the tool the file may be caused to entirely fill said space. It will be apparent, however, that the proper position of the file in side-dressing the teeth is substantially that shown in Fig. 7, in which the butt-end of the file or the bearing-surface thereof is slightly below the bearing-surface of the opposite ends, this position of the file being necessary in order to accommodate the set of the teeth of the saw.

The method of operating the tool in order to regulate the curvature of the teeth is shown in Fig. 10, and in this operation the transversely-adjustable plate 14 is moved in the direction of the bottom of the tool until the head of the screw 19 is flush with the end of said plate adjacent to the top of the tool. The file 29 is then inserted between the flange 7 and the head of said screw, and the tool is placed against the side of the saw which is provided with teeth. The end screws 17 are then turned and screwed inwardly, so as to give the file the proper curvature, as clearly shown in Fig. 10, and the said tool with the file therein is then passed longitudinally of the saw or over the points of the teeth, and this operation regulates the curvature of the teeth, as will be readily understood.

The cutting-teeth of the saw are designated by the reference-numeral 30 and the raker-teeth by the reference-numeral 31, and in fixing the length of said raker-teeth the transversely-adjustable plate 14 is moved in the direction of the bottom of the tool to the limit of its transverse movement, in which position the bottom of the flange or angular extension 15 of said plate is even with the inner side of the bottom flange 9 of the tool, and the transversely-adjustable plate 14 is then secured in position by the screw 19. The tool is then placed against the side of the saw provided with the teeth, as shown in Fig. 11, and moved downwardly thereon until the raker-teeth 31 pass through the slot 16, formed in the angular extension or flange 15 of the transversely-adjustable plate 14, and the screw 21 is operated to hold the transversely-adjustable plate in this position and prevent its lateral movement. In this operation the points of the cutting-teeth press on the inner side of the flange 9, and when in this position if the raker-teeth project through the flange or angular extension 15 of the plate 14 they are filed off to the required point, it being understood that these teeth should always be shorter than the cutting-teeth.

It will thus be seen that I provide a single combination-tool, by means of which the cutting-teeth of a saw may be properly set and side-dressed and the set of said teeth tested and regulated and also by means of which the curvature of the cutting-teeth and the length thereof and the length of the raker-teeth may be tested and regulated, a single tool of the class described being all that is necessary to keep a saw in proper order at all times.

The slots or openings 26 in the side of the oblong plate 25 are made of different widths, so as to accommodate the device to saws of different thicknesses, and the longitudinal groove 24, adjacent to the back flange 23 at the bottom of the tool, is designed to afford space to accommodate the set of the teeth when the tool is placed against the side of the saw, as shown in Fig. 11.

My improved tool is simple in construction and operation and also comparatively inexpensive, and it will be apparent that changes in and modifications of the construction described may be made without departing from the spirit of my invention or sacrificing its advantages.

Having fully described my invention, I claim as new and desire to secure by Letters Patent—

1. A saw-tool which is oblong in form and which comprises a top, a bottom, front and back portions, said tool being provided at the front with three parallel longitudinal flanges, two of which are flush with the top and bottom portions respectively, and between which are two longitudinal spaces, one of which is wider than the other, the narrower space being adjacent to the top of the tool, a plurality of screws which are passed through the top flange and are adapted to be passed through the adjacent flange by which the narrower longitudinal space is formed, the back of the tool being also provided at the bottom thereof with a longitudinal flange, and said bottom being cut out centrally to form an oblong space, and the front flanges being also cut out transversely to form a transverse space which communicates with the bottom space, and a transversely-movable plate mounted in the said transverse space and provided with an angular portion or flange which projects backwardly and fits in the bottom space, and in which is formed a longitudinal slot, and means for adjusting the said transversely-movable plate, substantially as shown and described.

2. In a tool of the class described, a body portion provided at one edge of one side with a pair of flanges divided by a space, a plate movably mounted upon the other side and provided with an angularly-directed extension at one end which fits in the space between said flanges, and is provided with a slot through which the teeth of a saw may be passed, said plate being connected with said body portion by means of an adjustable device which passes through a slot formed therein, and a second adjustable device connected with said body portion and operating in connection with said angularly-directed extension, substantially as shown and described.

3. The herein-described means for side-dressing and evening the set of the teeth of a saw which comprises a body portion provided at either end with a bearing ledge or surface, and with flanges directed at right angles to said bearing-ledges, the bearing-surface of one of said bearing-ledges being in an altitude nearer the outer edge plane of said flanges than the other, the relative arrangement and construction being such that when a file of ordinary construction is seated upon said bearing-ledges, the base or body of the file will at all times be above the outer edges of said flanges and that the point of said file may in no point of its adjustment be below the outer edges of said flanges, substantially as shown and described.

In testimony that I claim the foregoing as my invention I have signed my name, in presence of the subscribing witnesses, this 19th day of July, 1899.

EZRA L. POST.

Witnesses:
F. A. STEWART,
V. M. VOSLER.